Feb. 4, 1941.   W. H. FRANK   2,230,427
ELECTRICAL DISTRIBUTION SYSTEM
Filed Feb. 21, 1940   3 Sheets—Sheet 1
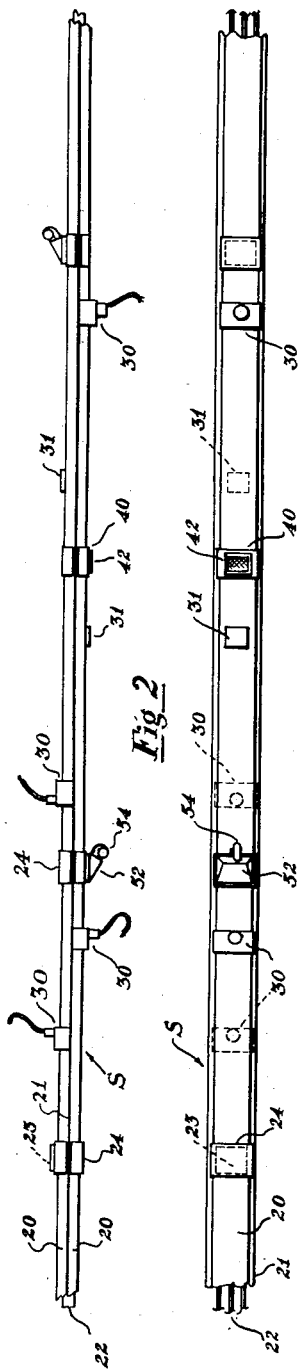
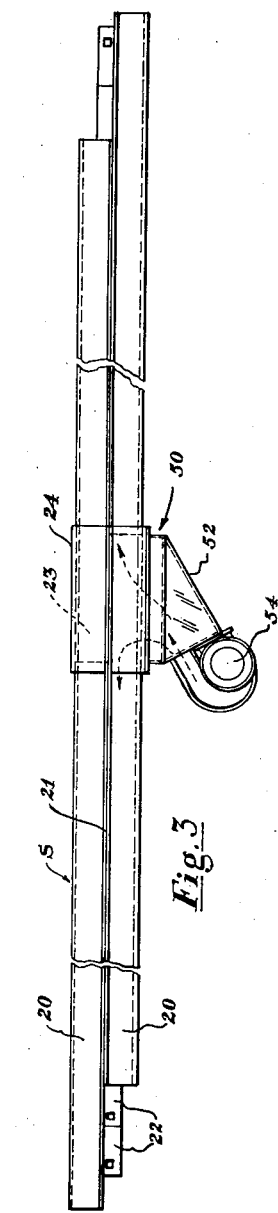
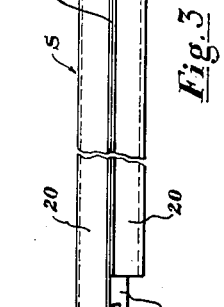
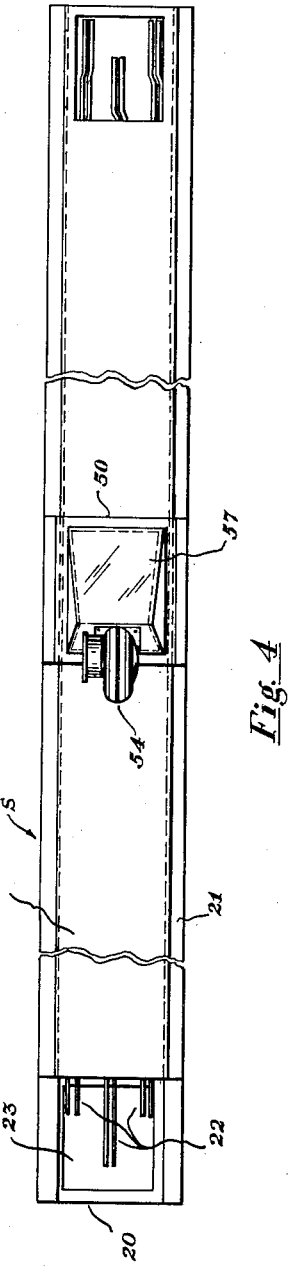
INVENTOR.
William H. Frank
Daniel G. Cullen
ATTORNEY.

Feb. 4, 1941.   W. H. FRANK   2,230,427
ELECTRICAL DISTRIBUTION SYSTEM
Filed Feb. 21, 1940   3 Sheets-Sheet 2

INVENTOR.
William H. Frank
Daniel G. Cullen
ATTORNEY.

Feb. 4, 1941.  W. H. FRANK  2,230,427
ELECTRICAL DISTRIBUTION SYSTEM
Filed Feb. 21, 1940  3 Sheets-Sheet 3

INVENTOR.
William H. Frank
BY Daniel G. Cullen
ATTORNEY.

Patented Feb. 4, 1941

2,230,427

UNITED STATES PATENT OFFICE 2,230,427

ELECTRICAL DISTRIBUTION SYSTEM

William H. Frank, Detroit, Mich.,

Application February 21, 1940, Serial No. 320,117

3 Claims. (Cl. 174—16)

This application relates to electrical distribution systems of the bus duct type generally comprising a duct run containing bus bars at desired intervals of which are connected current take-off devices or branch plugs.

A bus duct system generally includes a sheet metal casing formed with hand-holes and branch holes, there being provided hand-hole covers and branch hole covers. Within the duct and suitably supported by insulator supports are bus runs. Such a bus duct system is disclosed in the patent to William H. Frank et al., No. 2,041,675, of May 19, 1939.

This application particularly relates to air circulating arrangements for such bus duct systems.

In the use of such systems it has been discovered that the load capacity of a system may be increased, not by the addition of larger bus bars, but merely by providing a circulating stream of air within the duct, whereby excessive heating is eliminated. In this application there is disclosed a novel arrangement of duct, equipped with air blowers and filters, and novel means for securing and mounting the air blowers and filters in place in the system.

For an understanding of the system herein disclosed, reference should be had to the appended drawings. In these drawings, Figs. 1 and 2 show a bus duct system to small scale in plan and elevation;

Figs. 3 and 4 are elevation and bottom plan views of a fragment to larger scale;

Figure 5:
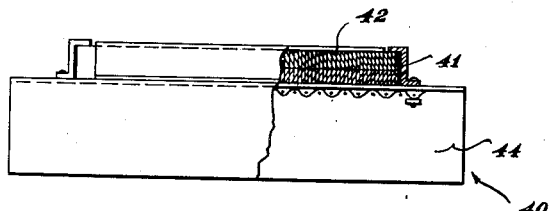
Figs. 5-7 show filter and blower units, to still larger scale, with Fig. 6 being a top plan view of Fig. 5.

Referring to the drawings it will be seen that the duct run is made up of standardized sections S each including halves 20 of equal length having co-operating longitudinal edge flanges 21 through holes of which pass joining screws or bolts. Inside the duct are bus bars 22.

Sections of bus bar and of duct, forming sections of bus duct, are joined end to end, and to provide access to the interior of the duct there are formed in the casing or duct hand holes 23 normally covered by hand hole cover plates 24 secured to the duct by screws 25 threaded into tapped holes 26 of the duct. These hand holes and their covers are of relatively large area as indicated.

The bus bars 22 are supported in the casing by pedestal type insulation supports 28 of a character shown in Patent No. 2,084,580 of June 22, 1937, particularly Fig. 1, for example.

At intervals along the bus duct there are provided holes 29 through which prongs or contacts of branch plugs or current take-off devices 30 may be inserted for engagement with the bus bars for current take-off, the plugs being secured to the duct by means of the joining screws or bolts, selected ones of which are used for this purpose.

Normally the branch holes are closed by shutters or branch hole covers 31 which may be swung out of place when a branch plug is to be applied to a duct.

Thus far there has been described the system as it has been known prior to the addition to it of the improvements herein disclosed which relate particularly to arrangements for providing a stream of air coursing through the duct. Such arrangements will now be described.

Figure 6:
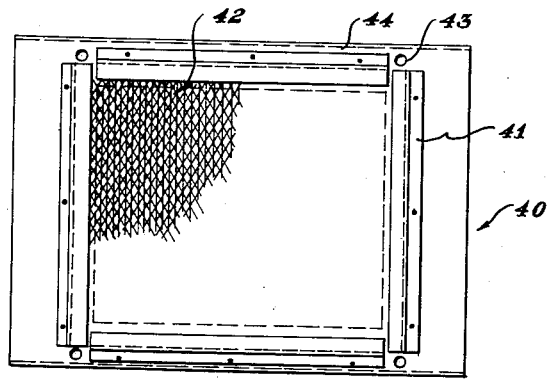

Figs. 5 and 6 show a filter unit consisting of a frame 40 on which is mounted, as by means of the Z shaped mounting stripe 41, a filter pad 42. The filter unit is formed of an area slightly larger than that of a hand hole and is intended to be applied to duct at a hand hole, to replace the normally provided hand hole cover. For that reason the frame of the filter unit is formed with holes 43 through which may be passed screws threading into the tapped holes of the duct which receive the hand-hole cover screws. The frame is adapted to seat against a wide face of the duct and is formed with flanges 44 embracing the narrow sides of the duct.

Figure 7:
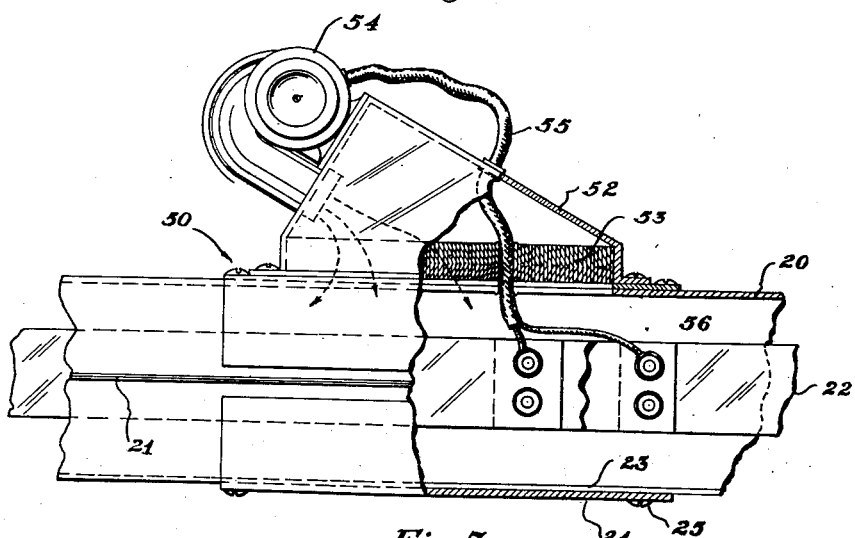

Fig. 7 shows a filter blower unit consisting of a frame 50 like the frame 40 and having thereon a supplementary casing 52 containing and mounting a filter pad 53 and an electric motor driven blower 54 of any desired construction. The motor supply may be obtained through a cable 55 which has on the free ends of its conductors terminals 56 which may be connected to the bus bars of the duct where they join adjacent the blower unit whereby the motor of the blower is supplied from the bus bars of the duct. The filter blower unit of Fig. 7, like the filter unit of Figs. 5 and 6, may be applied to any hand hole of the duct, to replace the normally provided hand hole cover and may be secured to the duct by screws threading into the tapped holes of the duct which receive the hand hole cover screws. The blower unit frame 50, like the filter unit frame 40, is adapted to be disposed against wide flat base of the duct and has side flanges for embracing the narrow sides of the duct.

Figure 8:
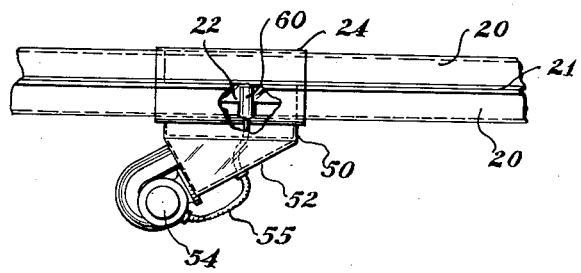
Figs. 8-9 show various arrangements for electrically connecting the blower unit to the bus bars for supply.
Figure 9:
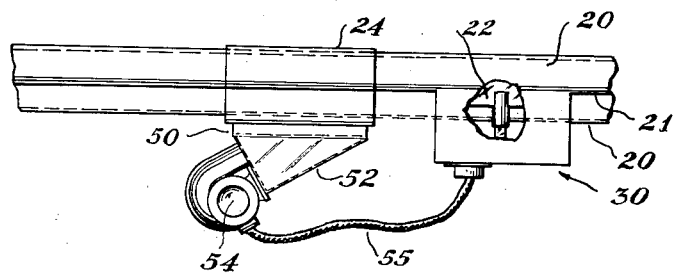
Figure 10:
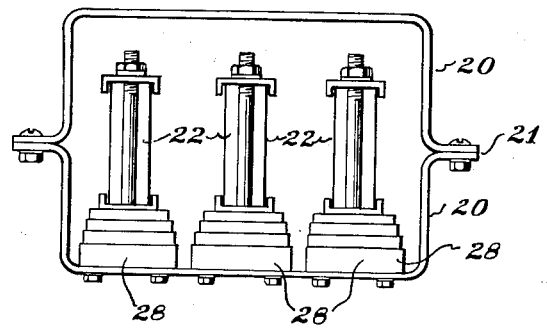
Fig. 10 shows a bus supporting arrangement.

Fig. 8 shows the terminals of the motor supply conductors in the form of prongs 60 like those of any branch plug;

Fig. 9 shows them as connected to a branch plug.

The supports for the bus bars, it will be observed, are so constructed as not to interfere with free coursing of the air in the duct and this is important, because if barrier type supports, such as are shown in Design Patent No. 92,244 were used, free coursing of air through the duct would not be possible.

It will be understood that a system of the character under consideration is generally used in long runs having numerous branch plugs, numerous bends, and numerous trunk and branch lines. The selective application of blowers and filters wherever isolated high temperature spots are found in the duct, due either to the load conditions in that part of the duct or to ambient conditions, which load conditions throughout the duct vary because of the presence of branch circuits and branch plugs and branch runs, forms an important part of the invention hereof and while no extensive showing of branch plugs and branch runs is here provided, it will be understood that the system herein disclosed, only a fragment of which is shown in the drawings, is normally far greater in extent and in branching arrangements than the fragment shown, which fragment is selected only by way of example.

Now having described the system herein disclosed, reference will be had to the appended claims.

We claim:

1. A bus duct system comprising a duct run having longitudinally and uniformly spaced hand holes normally closed by hand hole covers secured thereto by detachable fasteners, and containing bus runs spaced from the duct and supported therein by longitudinally spaced insulator supports, these being formed to permit air within the duct to course freely along and within the duct, past the supports, certain of the hand hole covers being removed, air inlet filter units secured to the duct at hand holes from which covers were removed, and so formed as to fit the duct where applied thereto and form ventilator covers over such hand holes, and formed to be fastenable to the duct by the hand hole fasteners or by fasteners complementary thereto, so that ventilator covers and hand hole covers are interchangeable.

2. A bus duct system comprising a duct run having longitudinally and uniformly spaced hand holes normally closed by hand hole covers secured thereto by detachable fasteners, and containing bus runs spaced from the duct and supported therein by longitudinally spaced insulator supports, these being formed to permit air within the duct to course freely along and within the duct, past the supports, certain of the hand hole covers being removed, air inlet filter units secured to the duct at hand holes from which covers were removed, and so formed as to fit the duct where applied thereto and form air filtering covers over such hand holes, and formed to be fastenable to the duct by the hand hole fasteners or by fasteners complementary thereto, so that filter covers and hand hole covers are interchangeable, certain of the filter covers having blowers mounted thereon and forming part thereof so as to form blower-filter units.

3. A bus duct system comprising a duct run having longitudinally and uniformly spaced hand holes normally closed by hand hole covers secured thereto by detachable fasteners, and containing bus runs spaced from the duct and supported therein by longitudinally spaced insulator supports, these being formed to permit air within the duct to course freely along and within the duct, past the supports, certain of the hand hole covers being removed, air blower units secured to the duct at hand holes from which covers were removed, and so formed as to fit the duct where applied thereto and form air blowing covers over such hand holes, and formed to be fastenable to the duct by the hand hole fasteners or by fasteners complementary thereto, so that blower covers and hand hole covers are interchangeable.

WILLIAM H. FRANK.